United States Patent [19]

Bednarek

[11] Patent Number: 4,716,741
[45] Date of Patent: Jan. 5, 1988

[54] AIR-CONDITIONING INSTALLATION FOR MOTOR VEHICLES, ESPECIALLY FOR PASSENGER MOTOR VEHICLES

[75] Inventor: Henryk Bednarek, Landsberg, Fed. Rep. of Germany

[73] Assignee: Bayerische Motoren Werke Aktiengesellschaft, Munich, Fed. Rep. of Germany

[21] Appl. No.: 852,216

[22] Filed: Apr. 15, 1986

[30] Foreign Application Priority Data

Apr. 24, 1985 [DE] Fed. Rep. of Germany ....... 3514781

[51] Int. Cl.$^4$ ......................... F25B 41/00; F25B 13/00
[52] U.S. Cl. ..................................... 62/197; 62/324.6; 62/DIG. 17
[58] Field of Search .............. 62/197, 158, 160, 324.1, 62/324.6, DIG. 17

[56] References Cited

U.S. PATENT DOCUMENTS

| | | | |
|---|---|---|---|
| 3,209,551 | 10/1965 | Jentet | 62/324.1 X |
| 3,812,687 | 5/1974 | Stolz | 62/323 |
| 4,173,865 | 11/1979 | Sawyer | 62/324.6 |

FOREIGN PATENT DOCUMENTS

| | | |
|---|---|---|
| 0001901 | 5/1979 | European Pat. Off. . |
| 1251493 | 10/1967 | Fed. Rep. of Germany . |
| 3047955 | 7/1982 | Fed. Rep. of Germany . |
| 3219950 | 12/1983 | Fed. Rep. of Germany . |
| 1554833 | 1/1969 | France . |

*Primary Examiner*—Harry Tanner
*Attorney, Agent, or Firm*—Barnes & Thornburg

[57] ABSTRACT

An air-conditioning installation for motor vehicles, especially for passenger motor vehicles, in which the cooling medium circulation is adapted to be switched from cooling to heating by a flow direction reversal. For purposes of heating, a by-pass line which by-passes the expansion valve effective during cooling and which contains a pressure-holding valve, terminates in a multi-channel partial area of the cooling-condenser effective as heating-evaporator so that a high heat output is produced from the compression heat and from the additional heat pump effect.

16 Claims, 1 Drawing Figure

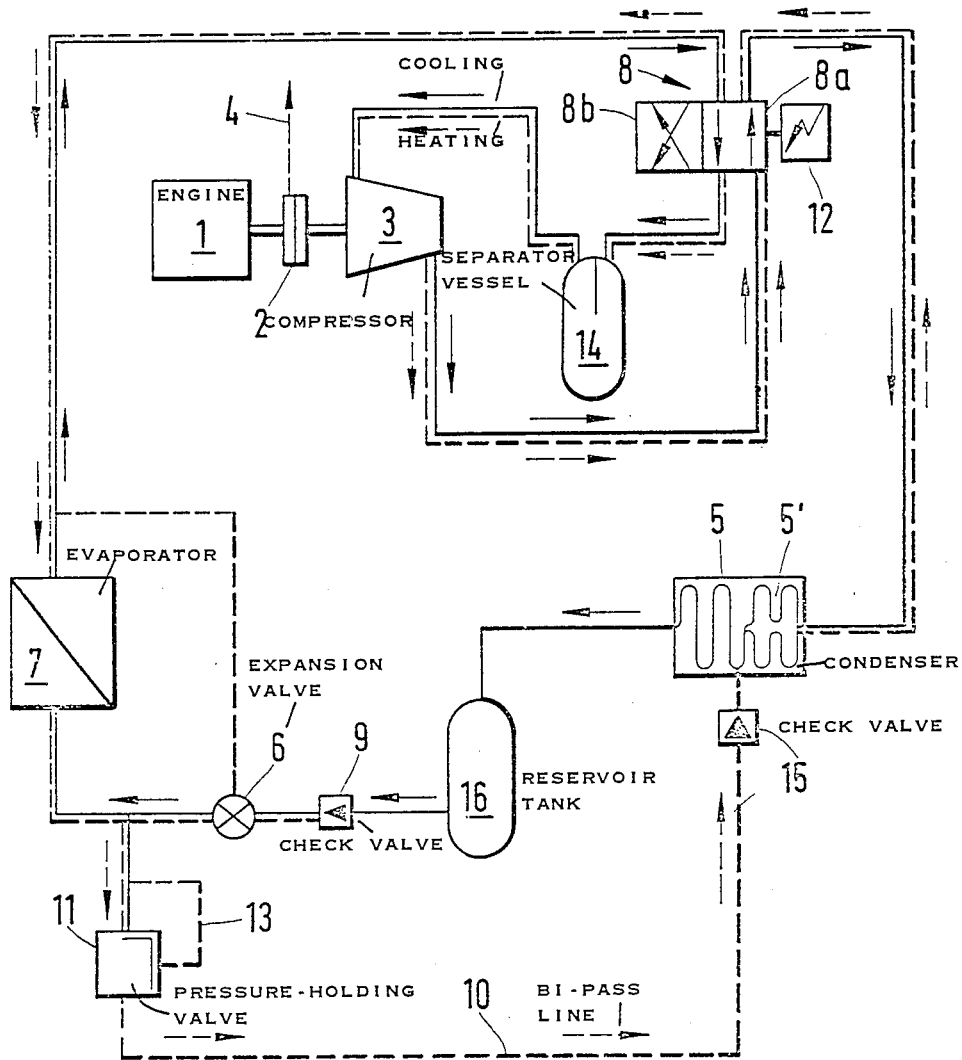

AIR-CONDITIONING INSTALLATION FOR MOTOR VEHICLES, ESPECIALLY FOR PASSENGER MOTOR VEHICLES

BACKGROUND AND SUMMARY OF THE INVENTION

The present invention relates to an air-conditioning installation for motor vehicles, especially for passenger motor vehicles, with a circulation adapted to be switched from cooling to heating of the vehicle interior space by way of a switching device, in which for purposes of cooling the cooling medium flows successively through a compressor, a condenser, an expansion valve, and an evaporator, and in which for purposes of heating the expansion value is by-passed in the opposite flow direction by means of a by-pass line containing a pressure-holding valve.

An air-conditioning system of this type of construction is disclosed in the U.S. Pat. No. DE-OS 30, 47, 955 and features a by-pass line which terminates downstream of the cooling-condenser, respectively, heating-evaporator, in the cooling medium line leading, during heating, at the suction side of the compressor. The cooling-condenser, respectively, heating-evaporator, is therefore not traversed by the flow during heating and thus acts as heat-evaporator only immediately after the beginning of heating for a short period of time until reaching a state of equilibrium.

It is the object of the present invention to further develop the known air-conditioning installation so that the cooling-condenser can be utilized continuously as heating-evaporator during heating in order to enable, in addition to the compression heat of the compressor, a further increased heat output by the heat pump effect, and more particularly at least during the warm-up period of the engine cooling circulation system, up to an engine operating temperature sufficient for the heating purpose and up to a freeze-up of the heating-evaporator which will occur under certain circumstances at an outside temperature near the zero point.

The underlying problems are solved according to the present invention in that the condenser which serves during the heating as heating-evaporator, is of multi-flow or multi-channel construction in a partial section starting from the inlet side during the cooling, or toward the outlet side during heating, and a single channel construction joined to the multi-line construction at a bifurcation joint and wherein the by-pass line terminates in the flow direction during the heating ahead of the bifurcation or within the area of the bifurcation toward the multi-flow or multi-channel area of the heating-evaporator. As a result thereof, the heating-evaporator and the connection thereof to the by-pass line is matched to the evaporation temperature which is particularly low at low temperatures of the cooling medium and to the specific volume of the cooling medium which is very large therewith, so that the evaporation thereof and the flow thereof is favored and the heat output is altogether considerably increased without impairing the function of the cooling-condenser in the counter-flow direction of the cooling medium during the cooling. The cooling medium is thereby also in vapor form during the inflow into the cooling-condenser and thus also has a relatively large specific volume in the first partial area thereof. This single-flow or single-channel partial area of the cooling-condenser which remains in the flow direction during cooling, assures the full cooling output of the air-conditioning installation.

A particularly advantageous division of the cooling-condenser, respectively, heating-evaporator is obtained if the multi-flow or multi-channel partial area amounts to 30% to 50% of the cooling medium volume of the condenser. The temperature-dependent control of the pressure-holding valve which controls the pessure of the cooling fluid in the evaporator, depends on the temperature of the inflowing cooling medium to the pressure holding valve and which within the range of about and below 0° is considerably lower than the pressure at higher temperatures that is controlled to be considerably higher and remains constant. This also takes into consideration the particularly low vapor pressure of the cooling medium at low temperatures with a relatively small cooling medium-feed quantity of the compressor conditioned thereby. In order to assure a rapid start of the heating action of the cooling-evaporator acting as heating-condenser, the pressure value of the pressure-holding valve which is reduced with the temperature of the cooling medium flowing into the same, enables a rapid emptying of the heating-evaporator of cold liquid-cooling medium. At the same time, the vapor-like part of the cooling medium which occurs downstream of the pressure-holding valve as a result of the expansion, limits the pressure decrease on the compressor suction side and assures a sufficiently high cooling medium-density and -feed quantity of the compressor. A particularly advantageous heating function is obtained if the pressure of 15 bar beginning at +5° C. drops to 8 bar at −20° C. According to another feature of the present invention, a time delay switching device is provided which switches the circulatory system during termination of the heating operation with time delay to cooling operation. As a result of this time delay switching action, operating troubles at the end of the heating function by an immediate switching-over of the circulatory system to cooling and therewith possible penetration of liquid cooling medium from the heating-condenser, respectively, cooling-evaporator into the suction side of the compressor are precluded. This is true because up to the point of switching-over, the pressure of the cooling medium is reduced by the cooling off of the cooling medium and a back-flow of the cooling medium fails to take place far-reachingly during a later switching-over. The switching-over device has a normal switch position in its adjustment for heating, thus avoiding the additional structural expenditure of a time-delay switching device and starts with the fact that a heating and cooling one shortly behind the other is not to be expected because of the climatic conditions.

These and other objects, features and advantages of the present invention will become more apparent from the following description when taken in connection with the accompanying drawing which shows, for purposes of illustration only, one embodiment in accordance with the present invention, and wherein:

BRIEF DESCRIPTION OF THE DRAWINGS

The FIGURE is a schematic diagram illustrating in principle the circulation of an air-conditioning system for motor vehicles in accordance with the present invention which can be utilized alternatively for cooling and heating.

DETAILED DESCRIPTION OF THE DRAWINGS

Referring now to the single FIGURE of the drawing, an engine 1 of a motor vehicle drives by way of a clutch 2 a compressor 3. A control permits a disengagement or engagement of the clutch as needed. For purposes of cooling of a vehicle interior space (full line flow arrows) the cooling medium compressed in the compressor 3 reaches the condenser 5 which is of two-channel construction (double-flow construction) in an inlet side partial area 5' of 30% to 50%, which is connected by a bifurcation joint to a single channel construction and from there by way of the expansion valve 6 the evaporator 7 and finally again the suction side of the compressor 3. The evaporation heat necessary in the evaporator 7 for the evaporation of the cooling medium is removed by way of the lamellae of the evaporator 7 from the air stream which flows through the evaporator 7 and, in this manner, reaches the vehicle interior space cooled-off.

A four-way valve generally designated by reference numeral 8 is connected downstream of the compressor 3 whose operating line connections are in communication with the condenser 5 and the evaporator 7. The return flow line connection of the four-way valve 8 is connected with the suction side of the compressor 3. A check valve 9 opening in the direction toward the expansion valve 6 is arranged between the four-way valve 8 and the expansion valve 6. Furthermore, the circulation includes a by-pass line 10, by-passing the expansion valve 6 which includes a pressure-holding valve 11.

The four-way valve 8 has two switching positions, namely, the switching position 8a for cooling operation and the switching position 8b for heating operation, and an electric switching device 12 which includes a time-delay switching device which will provide a delayed switching time when switching from heating to cooling. Alternatively the switch can be normally located in the heating position, since shifting from heatin to cooling would thus be delayed, a normal rest position for heating. The pressure-holding valve 11 involves a pressure limit valve which is responsive to the temperature of the cooling medium and is of conventional construction. This temperature responsive pressure limiting valve holds the compressor pressure and therewith also the pressure in the evaporator 7 to 15 to 25 bar during heating operation with a cooling medium temperature above +5° C. and which, upon reaching this pressure, opens. A control 13 for the pressure-holding valve 11 effects a lower opening pressure at lower cooling medium temperature, which drops from 15 bar at +5° C. to 8 bar at −20° C.

During the heating operation (dashed arrows), a part of the compressor heat produced by the compressing of the cooling medium and of the atmospheric heat absorbed by heat-pump function from the atmospheric air in the cooling-condenser 5 acting as heating-evaporator, is given off in the cooling-evaporator 7 acting as heating-condenser to the air supplied to the vehicle interior space or circulated in the vehicle interior space as circulated air, and the interior space is thus rapidly heated up with a still cold engine and a rapid windshield defrosting is attained. Under these conditions, the compressor 3 and therewith the heating operation of the air-conditioning system remains in operation meaningfully for such length of time until the temperature of the engine cooling water has reached a sufficiently high value in order to heat alone the vehicle passenger space by way of the usual heating apparatus.

A separator vessel 14 is arranged between the four-way valve 8 and the suction side of the compressor 3. The separator vessel 14 protects the compressor 3 from liquid shocks during the switching-over operation and additionally serves to separate the eventually occurring liquid-cooling medium downstream of the pressure-holding valve 11.

A further check valve 15 which opens during the heating in the direction toward the cooling condenser, respectively, heating-evaporator 5, is provided in the by-pass line 10 whereas a reservoir tank 16 is additionally interconnected between the condenser 5 and the first check valve 9. The check valves 9 and 15 assure proper directional flow of fluid through the expansion valve 6 or through the pressure-holding valve 11 which becomes operable depending on the type of start of the air-conditioning system for purposes of cooling, respectively, heating. The installation enables a heat output of about 5 to 7 KW at relatively low engine and compressor rotational speeds. It is suited both for short time operation up to the point of being relieved by the heating system operated with the engine heat for use in moderate to cold climatic zones and for continuous operation in lieu of an aforementioned heating system in far-reachingly hot climate zones.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An air-conditioning installation for motor vehicles, comprising a circulatory means switchable from cooling to heating of a vehicle passenger space by way of a switching means; compressor means; condenser means having a single flow section connected to a multi-line parallel flow-section through a bifurcation means; an expansion valve means; and an evaporator means; the cooling medium successively flowing through; the compressor means, the condenser means, the expansion valve means and the evaporator means back to the compressor means for purposes of cooling; a by-pass line including a pressure-holding valve means and by-passing the expansion valve means in the opposite flow direction for purposes of heating; the condenser means, which during heating serves as heating-evaporator means, being of multi-line parallel flow section toward the inlet of the condenser means during cooling or toward the outlet of the condenser means during heating; and wherein the by-pass line terminates in the condenser means in the flow direction during heating within the single flow section ahead of the bifurcation means or within the area of the bifurcation means.

2. An air-conditioning installation according to claim 1, whein the multi-line parallel flow section has an area amounting to about 30% to about 50% of the cooling medium volume of the condenser means.

3. An air-conditioning installation according to claim 2, wherein the pressure-holding valve means controls a variable pressure of the cooling medium in the evaporator means dependent on the temperature of the inflowing cooling medium thereto; and which, within the range of about and below 0° C., maintains the pressure in the evaporator means considerably lower than pressure at higher temperatures of the inflowing cooling medium.

4. An air-conditioning installation according to claim 3, wherein the pressure holding valve allows pressure of about 15 bar beginning at +5° C. temperature of the cooling medium and drops the pressure to about 8 bar at −20° C.

5. An air-conditioning installation according to claim 4, wherein the switching means has a delay means which provides for a time delay on the switching means being able to switch the circulation means to cooling from heating after termination of a heating operation.

6. An air-conditioning installation according to claim 4, wherein the switching means is normally in a position for heating.

7. An air-conditioning installation according to claim 1, wherein the pressure-holding valve means controls a variable pressure of the cooling medium in the evaporator means dependent on the temperature of the inflowing cooling medium thereto; and which, within the range of about and below 0° C., maintains the pressure in the evaporator means considerably lower than pressure at higher temperatures of the inflowing cooling medium.

8. An air-conditioning installation according to claim 7, wherein the pressure holding valve allows pressure of about 15 bar beginning at +5° C. temperature of the cooling medium and drops the pressure to about 8 bar at −20° C.

9. An air-conditioning installation according to claim 1, wherein the switching means has a delay means which provides for a time delay on the switching means being able to switch the circulation means to cooling from heating after termination of a heating operation.

10. An air-conditioning installation according to claim 1, wherein the switching means is normally in a position for heating.

11. An air-conditioning installation according to claim 7, wherein the pressure holding valve allows pressure of about 15 bar beginning at +5° C. temperature of the cooling medium and drops the pressure to about 8 bar at −20° C.

12. An air-conditioning installation according to claim 1, wherein the switching means has a delay means which provides for a time delay on the switching means being able to switch the circulation means to cooling from heating after termination of a heating operation.

13. An air-conditioning installation according to claim 1, wherein the switching means has a delay means which provides for a time delay on the switching means being able to switch the circulation means to cooling from heating after termination of a heating operation.

14. An air-conditioning installation according to claim 7, wherein the switching means is normally in a position for heating.

15. An air-conditioning installation according to claim 8, wherein the switching means is normally in a position for heating.

16. An air-conditioning installation according to claim 9, wherein the switching means is normally in a position for heating.

* * * * *